Nov. 7, 1967  A. M. LLOYD  3,350,843
METHOD AND APPARATUS FOR DEODORIZING OIL
Filed Oct. 2, 1964

INVENTOR
ANTHONY M. LLOYD
BY
Holcombe, Wetherill + Brisebois
ATTORNEYS

United States Patent Office 3,350,843
Patented Nov. 7, 1967

3,350,843
METHOD AND APPARATUS FOR
DEODORIZING OIL
Anthony Michael Lloyd, Walkington, near Beverley, England, assignor to Rose, Downs & Thompson Limited, Kingston-upon-Hull, Yorkshire, England
Filed Oct. 2, 1964, Ser. No. 401,202
4 Claims. (Cl. 55—15)

This invention relates to processing liquids and the promotion of mass transfer between a liquid and gaesous streams. This can also be extended to mass transfer accompanied by reaction e.g. oxidation, neutralisation of effluent gases, gas scrubbing, solvent recovery and in particular, to the deodorising and hydrogenation of edible oils.

After refining, edible oils normally retain a number of odorous impurities. These are generally removed by treating the oil with sparge steam such that the impurities are vaporised and carried away by the steam.

Normally the oil is treated in bulk, the steam being bubbled through a mass of oil, but this method requires an inordinate length of time for effective operation; in the first place it depends on the steam bubbles coming in contact with the impurities randomly in the oil mass and, in the second place, the rate of absorption of the impurities decrease as the bubbles progress through the oil and become progressively saturated with the vapor of the odourous impurities.

An object of the invention is to enable oils to be deodorised rapidly in a continuous process.

The present invention resides in a method of processing a liquid in which a gas or vapour is mixed with the liquid and the mixture is subjected to ultra—or sub-sonic waves.

When an oil is to be processed with a gas or vapour according to the invention, the gas or vapour and the oil are intermixed and the mixture is subjected to vibratory action rapidly to change the interfaces between the oil and gas or vapour, while the oil is atomised. For example, when the oil is to be deodorised, it is treated with steam or an inert gas, while, when it is to be hydrogenated, it is treated with hydrogen.

The atomising of the oil may be effected independently of the vibratory action and, in this case, the mixing preferably occurs when the oil is in an atomised condition.

The invention will be more readily understood from the following description of one embodiment of apparatus for deodorising edible oil, given by way of example only, with reference to the accompanying drawings (FIGURES 1 to 3) schematically illustrating in section three forms of continuous deodorising plant.

Figure 1:
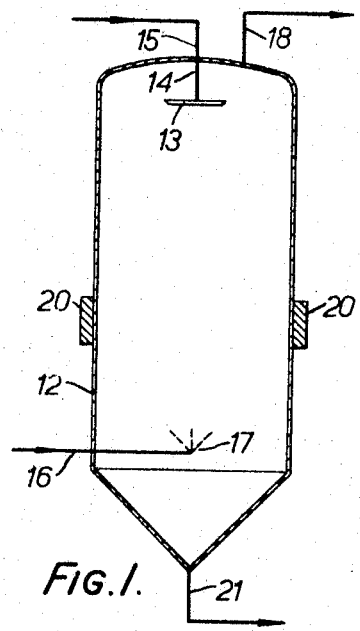

Referring to FIGURE 1, a gas tight processing tank 12 contains a plate 13 mounted on a rotatable shaft 14. The shaft 14 extends through the casing of the tank in bearings and a seal and is rotated by a motor (not shown). An oil inlet tube 15 is arranged to supply oil near the centre of the upper surface of plate 13.

A steam inlet tube 16 passes through the side wall of the tank 12 to a distributor 17 and a steam outlet 18 is provided adjacent the top of the tank 12. A number of ultra-sonic wave generators 20 are arranged round the sides of the tank 12 to direct ultra-sonic waves into the tank. An oil exit tube 21 is also provided at the base of the tank.

In operation the apparatus is maintained under vacuum and the plate 13 is rotated by the motor and heated oil is supplied through pipe 15 to the centre of the upper surfaces of the plate. The oil is flung outwardly by the centrifugal force and is atomised into droplets. A stream of steam from the distributor 17 is passed upwardly through the tank in contra-flow to the fall of the droplets from the plate 13.

The ultra-sonic waves from the generators 20 act on the oil as it is atomised and while it falls in atomised condition through the counter-flowing steam. These waves thus agitate the droplets and cause the droplet surfaces, in contact with the steam, to be rapidly changed. Any impurities within the droplets are thus brought to the surface during the descent of the droplets and are subjected to the vaporising and removing action of the contra-flowing steam.

When the waves are ultra-sonic, the removal of the impurities from the droplets is promoted by the periodic formation by the waves of an almost perfect vacuum round each droplet and the vaporisation of the impurities into the vacuum spaces so formed. The deodorised droplets collect at the base of the tank and are removed through the pipe 21, being thus continuously separated from the steam which leaves through the steam outlet 18. It will be seen that this is a continuous process and requires an apparatus of only small volume since the contact between the steam and the droplets of oil is improved. The invention is not limited to the use of ultra-sonic generators, but these may be replaced by sonic or subsonic generators, which, although they will not produce a vacuum round the droplets, vibrate the droplets sufficiently to bring new molecules continuously to the surface and so allow vaporisation of the impurities.

It should be understood that any form of atomiser may be used in place of that described and that when the oil is to be hydrogenated, instead of deodorised, hydrogen is substituted for the steam, the sonic, super-sonic or sub-sonic waves promoting the surface reaction between the hydrogen and the oil.

Figure 2:
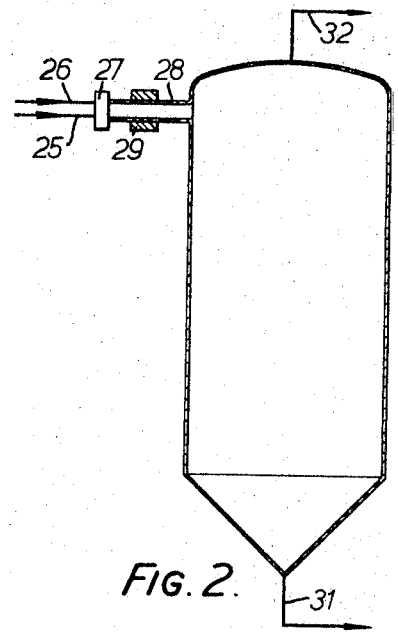
Figure 3:
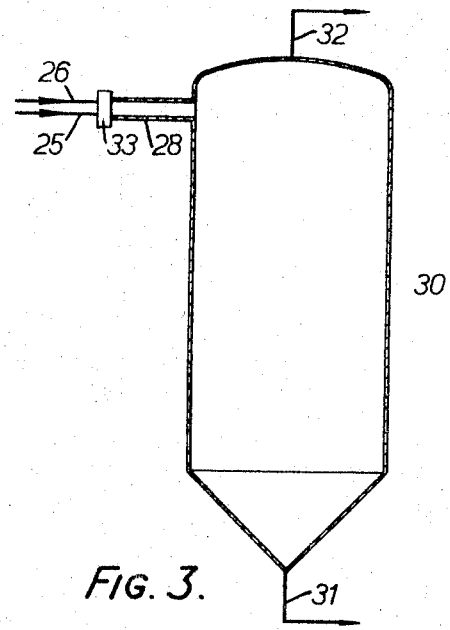

As distinct from the apparatus shown in FIGURE 1, the deodorising plants of FIGURES 2 and 3 operate co-currently i.e. the steam and oil move in the same direction. In FIGURE 2, the steam, or inert gas, and oil are supplied continuously through pipes 25, 26 to an in-line atomising device 27. The atomised oil and steam then pass through a large diameter pipe 28 provided with ultra-sonic vibrators 29 of any known form, such as those of the electro-strictive or magneto-strictive type.

The pipe 28 leads to a continuous separating device 30, in which the heavier deodorised oil particles are collected and removed through a discharge pipe 31 at the base, while the steam and the vaporised odiferous components are removed through a pipe 32 at the top of the device 30.

The operation is generally similar to that of FIGURE 1. The steam and oil particles are vibrated during passage through pipe 28, by the generators 29 to change the steam/oil interfaces continuously and hence promote transfer of the unwanted components from the oil to the steam. Separation is subsequently effected continuously in the device 30.

As before, any suitable form of atomiser may be employed for the device 27 and sonic and sub-sonic vibrators may be employed in place of the ultra-sonic vibrators if desired, but to less effect. Again as before, hydrogen may be substituted for the steam supplied to pipe 25 when hydrogenation, in place of deodorisation, is required.

The arrangement of FIGURE 3 is generally similar to that of FIGURE 2, but in this case the functions of the atomiser 27 and the ultra-sonic vibrators 29 are combined in a single atomiser 33 operating at ultra-sonic frequencies, the droplets of oil leaving the atomiser 33 in pulses at the ultra-sonic frequency with the same effect as has been described in connection with FIGURES 1 and 2.

I claim:
1. A method of processing oil with a substance in the gaseous state in which said substance in the gaseous state and the oil in an atomized state are intermixed during concurrent flow, the mixture is subjected to vibratory action to rapidly change the interfaces between the oil and substance while the oil is atomized, and the mixture is subsequently separated in a separating device, said substance in the gaseous state and said oil being passed through an ultrasonic atomizer located upstream of the separating device.

2. A method of processing oil with a substance in the gaseous state in which said substance in the gaseous state and the oil in an atomized state are intermixed during concurrent flow, the mixture is subjected to vibratory action to rapidly change the interfaces between the oil and substance while the oil is atomized, and the mixture is subsequently separated in a separating device, said substance in the gaseous state and said oil being passed through a sonic atomizer located upstream of the separating device.

3. Processing apparatus for edible oil comprising a sonic atomizing device, pipes for leading oil and substances in the gaseous state continuously to the atomizing device, and a continuous separating device for separating treated oil from constituents in the gaseous state, said separating device being connected to said atomizing device.

4. Processing apparatus for edible oil comprising an ultra-sonic atomizing device, pipes for leading oil and substance in the gaseous state continuously to the atomizing device, and a continuous separating device for separating treated oil from constituents in the gaseous state, said separating device being connected to said atomizing device.

References Cited
UNITED STATES PATENTS

| | | | |
|---|---|---|---|
| 2,532,554 | 12/1950 | Joeck | 116—137 |
| 2,989,143 | 6/1961 | Hallstrom | 55—54 |
| 3,202,281 | 8/1965 | Weston | 209—166 |
| 3,239,998 | 3/1966 | Carter et al. | 55—277 |

REUBEN FRIEDMAN, *Primary Examiner.*

C. N. HART, *Assistant Examiner.*